(12) United States Patent
Onda

(10) Patent No.: US 6,417,991 B1
(45) Date of Patent: Jul. 9, 2002

(54) RECORDING DISK DRIVE

(75) Inventor: Ryuichi Onda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/479,323

(22) Filed: Jan. 6, 2000

(30) Foreign Application Priority Data

Jun. 8, 1999 (JP) .......................................... 11-160408

(51) Int. Cl.$^7$ ................................................ G11B 5/40
(52) U.S. Cl. .................. 360/128; 360/97.01; 360/98.08
(58) Field of Search .......................... 360/97.01, 97.02, 360/254.3, 254.4, 254.8, 128, 130.34, 119, 120, 121, 254, 254.1, 254.5, 254.6, 254.7, 254.9, 98.08, 99.12

(56) References Cited

U.S. PATENT DOCUMENTS

| | | | |
|---|---|---|---|
| 5,239,431 A | | 8/1993 | Day et al. ................. 360/98.08 |
| 5,367,418 A | * | 11/1994 | Chessman et al. ........ 360/99.12 |
| 5,436,775 A | * | 7/1995 | Ishimatsu ................. 360/98.08 |
| 5,452,157 A | * | 9/1995 | Chow et al. .............. 360/98.08 |
| 5,490,022 A | * | 2/1996 | Hoishina et al. .......... 360/98.08 |
| 5,600,512 A | * | 2/1997 | Radwam et al. .......... 360/98.08 |
| 5,801,899 A | * | 9/1998 | Genheimer .............. 360/97.01 |
| 5,801,901 A | * | 9/1998 | Bryan et al. .............. 360/98.08 |
| 5,925,949 A | * | 7/1999 | Jung et al. ................. 310/67 R |
| 5,940,244 A | * | 8/1999 | Canlas et al. ............. 360/98.08 |
| 5,943,184 A | * | 8/1999 | Kelsic et al. .............. 360/98.08 |
| 5,973,879 A | * | 10/1999 | Reffetto et al. ........... 360/98.08 |
| 5,982,581 A | * | 11/1999 | Kazmierczak et al. ... 360/98.08 |
| 5,999,367 A | * | 12/1999 | Sakai ....................... 360/99.12 |
| 6,021,019 A | * | 2/2000 | Genheimer et al. ...... 360/97.01 |
| 6,055,134 A | * | 4/2000 | Boutaghou ............... 360/254.4 |
| 6,064,547 A | * | 5/2000 | Wittig et al. ............. 360/98.08 |
| 6,084,744 A | * | 7/2000 | Genheimer et al. ...... 360/97.02 |
| 6,115,214 A | * | 9/2000 | Allsup et al. ............ 360/254.3 |
| 6,125,017 A | * | 9/2000 | Misso et al. ............. 360/265.1 |
| 6,172,843 B1 | * | 1/2001 | Genheimer et al. ...... 360/97.01 |
| 6,175,469 B1 | * | 1/2001 | Ahmad et al. ........... 360/97.02 |
| 6,178,063 B1 | * | 1/2001 | Wood et al. ............. 360/98.08 |
| 6,208,486 B1 | * | 3/2001 | Gustafson et al. ....... 360/98.08 |
| 6,212,029 B1 | * | 4/2001 | Fioravantini ............. 360/97.01 |
| 6,212,031 B1 | * | 4/2001 | Kazmierczak et al. ... 360/98.08 |

FOREIGN PATENT DOCUMENTS

JP          403168985 A   *   7/1991

\* cited by examiner

Primary Examiner—Hoa T. Nguyen
Assistant Examiner—Franklin D. Altman, III
(74) Attorney, Agent, or Firm—Greer, Burns & Crain, Ltd.

(57) ABSTRACT

A recording disk drive comprises a recording disk. A head slider is supported at the tip end of a resilient suspension so as to face the recording disk. An elastic member is located behind the head slider at a position spaced from the head slider. When an impact is applied to the recording disk drive, the resilient suspension may warp to move the tip end away from the recording disk. The elastic member receives the tip end of the suspension. It is possible to restrain the warp of the suspension, namely, the movement of the head slider. Less resilience can be stored in the suspension. Accordingly, even when the stored resilience causes the tip end of the suspension to collide against the surface of the recording disk, a smaller impact of the head slider against the recording disk may allow less damage to the recording disk or the head slider. Shock resistance to the recording disk drive can be improved.

8 Claims, 3 Drawing Sheets

RECORDING DISK DRIVE

BACKGROUND OF THE INVENTION

1. Field of the Invention

The present invention relates to a recording disk drive comprising a head slider supported at the tip end of a resilient suspension so as to face a recording disk.

2. Description of the Prior Art

A recording disk drive or data storage system such as a hard disk drive (HDD) is often assembled in a portable electronic apparatus such as a notebook-sized personal computer and a personal digital assistant (PDA). A greater demand to a higher shock resistance has arisen in response to an increased opportunity of portability of the recording disk drive.

For example, a so-called contact start stop (CSS) control is usually employed in an HDD. The CSS control allows a magnetic recording disk to receive a flying head slider supported at the tip end of a resilient suspension when the recording disk stands still. The flying head slider is urged against the surface of the magnetic recording disk by a resilience of the suspension. When an impact is applied to the HDD in the aforementioned situation, the suspension sometimes warps to move the flying head slider away from the surface of the magnetic recording disk. Such impact may be caused when the HDD is dropped on the floor. The resilience stored in the suspension in this manner then causes, by reaction, the head slider to forcefully collide with the surface of the magnetic recording disk. The collision may make scars on the surface of the magnetic recording disk and/or induce a damage to a magnetic transducer embedded in the flying head slider.

SUMMARY OF THE INVENTION

It is accordingly an object of the present invention to provide a recording disk drive preventing to the utmost a recording disk and a head slider from damaging upon an impact.

According to the present invention, there is provided a recording disk drive comprising: a recording disk; a head slider supported at a tip end of a resilient suspension so as to face the recording disk; and an elastic member located behind the head slider at a position spaced from the head slider.

When an impact is applied to the recording disk drive, the resilient suspension may warp to move the tip end away from the recording disk. The elastic member receives the tip end of the warping suspension and/or the head slider at the tip end of the warping suspension. It is possible to restrain the warp of the suspension or the movement of the head slider. Less resilience can be stored in the suspension. Accordingly, even when the stored resilience causes the tip end of the suspension to collide against the surface of the recording disk, a smaller impact of the head slider against the recording disk may allow less damage to the recording disk or the head slider. Shock resistance to the recording disk drive can be improved.

In addition, when the tip end of the suspension and/or the head slider reactively collide against the recording disk in the aforementioned manner, the elastic member may absorb the impact of the suspension and/or the head slider by its elasticity. It is accordingly possible to avoid a powerful rebound of the head slider. The impact of the rebounded head slider upon recording disk, namely, the collision of the head slider against the recording disk can be weakened.

The elastic member may be attached to an enclosure enclosing at least the head slider and the recording disk. The elastic member in this manner serves to improve shock resistance of the head slider corresponding to the recording disk opposed to the inner surface of the enclosure.

A protrusion may be formed on the inner surface of the enclosure so as to receive the elastic member at its top. Such protrusion serves to reduce the thickness of the elastic member. Reduced thickness of the elastic member allows less irregularity in dimensions of the elastic member.

Otherwise, the elastic member may be attached to a cover coupled to an enclosure enclosing at least the head slider and the recording disk. The elastic member in this manner likewise serves to improve shock resistance of the head slider corresponding to the recording disk opposed to the inner surface of the cover. A protrusion may likewise be formed on the inner surface of the cover so as to receive the elastic member at its top.

The recording disk drive may further comprise: a rotation axis receiving the recording disk for rotation; a flange extending from the rotation axis in a centrifugal direction; and a clamp attached at a tip end of the rotation axis so as to urge the recording disk against the flange. The elastic member may be attached to the clamp. The elastic member in this manner serves to improve shock resistance of the head slider corresponding to the recording disk opposed to a cover, for example, coupled to the enclosure. In general, the cover tends to suffer from an accumulated dimensional tolerance when the recording disk drive is assembled. Attachment of the elastic member to the clamp serves to eliminate disadvantages of the accumulated dimensional tolerance as compared with the cover. Moreover, the clamp has a higher rigidity as compared with the cover. The clamp may receive the tip end of the suspension and/or the head slider with high rigidity.

In this case, the elastic member may be attached to an extension extending in a centrifugal direction of the clamp. The extension may be formed into an annular shape so as to entirely surround the clamp.

Furthermore, the recording disk drive may further comprise: a spindle motor receiving at least two of the recording disks for rotation; and a spacer interposed between the adjacent recording disk so as to receive the elastic member. This arrangement may contribute to a facilitated disposition of the elastic member between the recording disks.

In this case, the elastic member may be attached to an extension extending in a centrifugal direction of the spacer. The extension may be formed into an annular shape so as to entirely surround the spacer.

The aforementioned elastic member may be employed in a magnetic disk drive such as a hard disk drive (HDD) and the other types of recording disk drives.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
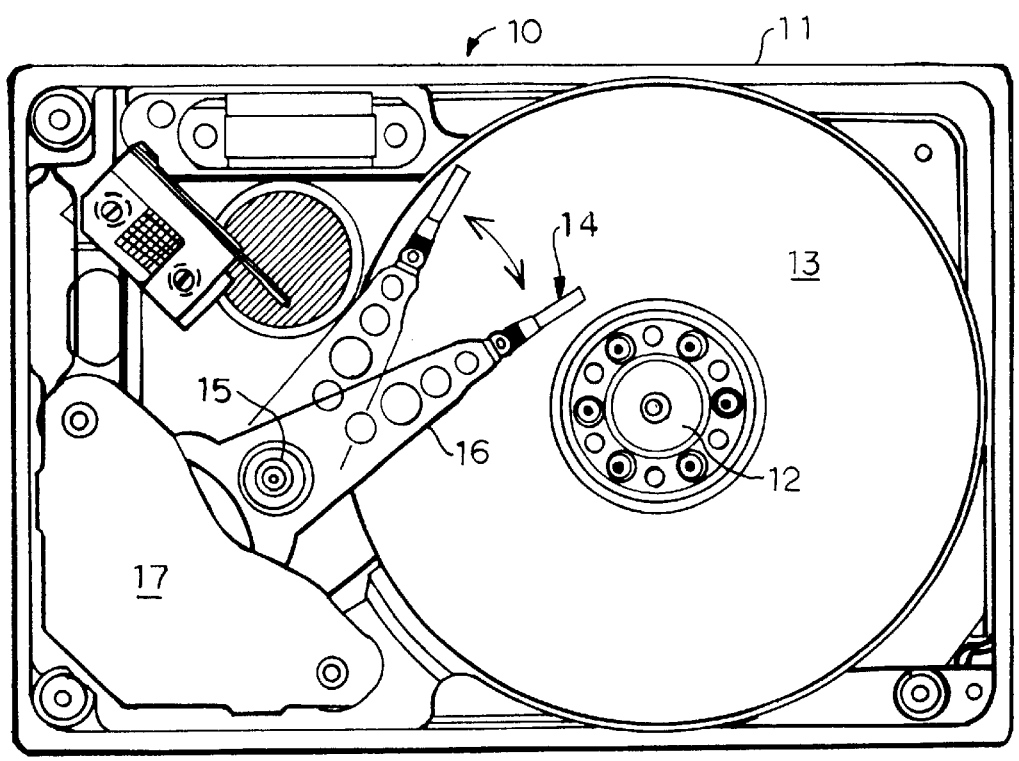
FIG. 1 is a plan view schematically illustrating the structure of a hard disk drive (HDD)

FIG. 1 illustrates the interior structure of a hard disk drive (HDD) 10 as an example of a recording medium drive. The HDD 10 comprises an enclosure 11 enclosing at least one disk-shaped recording medium or magnetic recording disk 13 mounted on a spindle motor 12, and a magnetic head assembly 14 opposed to the surface of the magnetic recording disk 13. As is conventionally known, the magnetic head assembly 14 is fixed at the tip end of a carriage arm 16 capable of swinging about a support axis 15. When information data is written into or read out of the magnetic recording disk 13, an actuator 17 comprising a magnetic circuit serves to drive the carriage arm 16 for swinging movement so as to move the magnetic head assembly 14 in the radial direction of the magnetic recording disk 13.

Figure 2:
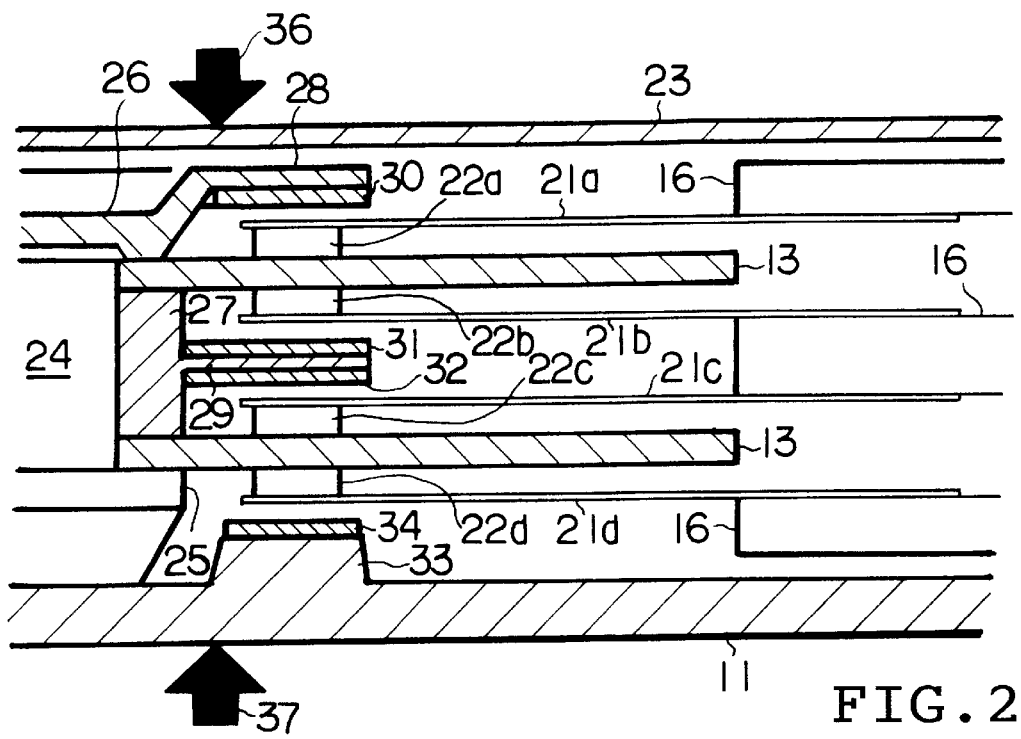
FIG. 2 is an enlarged partial sectional view of the HDD schematically illustrating an impact reduction mechanism according to a first embodiment of the present invention.

As shown in FIG. 2, for example, the individual magnetic head assembly 14 comprises a resilient suspension 21a–21d cantilevered at the tip end of the rigid carriage arm 16, and a flying head slider 22a–22d supported at the tip end of the resilient suspension 21a–21d. The suspensions 21a–21d may be made of a metallic leaf spring, for example. The suspensions 21a–21d are designed to urge the flying head sliders 22a–22d against the surfaces of the respective magnetic recording disks 13 when no load is applied to.

A head element or magnetic transducer, not shown, is supported on each of the flying head sliders 22a–22d so as to expose the tip end at an medium-opposed surface or bottom surface of the flying head slider 22a–22d. The aforementioned swinging movement of the carriage arm 16 serves to position the magnetic transducers on the flying head sliders 22a–22d above the target recording or data tracks on the magnetic recording disks 13. A cover 23 is coupled to the enclosure 11 so as to close the opening of the enclosure 11.

The magnetic disks 13 are mounted around a rotation axis 24 of the spindle motor 12. An outward flange 25 is formed at the lower end of the rotation axis 24 so as to extend in the centrifugal direction of the rotation axis 24. On the other hand, a disk-shaped clamp 26 is attached at the tip end of the rotation axis 24. The clamp 26 serves to urge the magnetic recording disks 13 against the outward flange 25. A ring-shaped spacer 27 is interposed between the adjacent magnetic recording disks 13. The spacer 27 serves to keep a constant interval between the adjacent magnetic recording disks 13. The clamp 26 and the spacer 27 may be made of a rigid metallic or ceramic body.

An impact reduction mechanism according to a first embodiment of the present invention comprises a first annular extension 28 formed on the clamp 26 so as to surround the clamp 26, and a second annular extension 29 likewise formed on the spacer 27 so as to surround the spacer 27. The first and second annular extensions 28, 29 extend entirely in the circumferential direction of the rotation axis 24. Annular elastic members 30, 31, 32 are fixed on the first and second annular extensions 28, 29. The respective elastic members 30, 31, 32 are opposed to the corresponding surfaces of the magnetic recording disks 13 at locations spaced from the magnetic recording disks 13 by a predetermined distance. The elastic members 30, 31, 32 may be made from natural rubber or synthetic resin elastomer. An adhesive may be employed to fix the elastic members 30, 31, 32 at the annular extensions 28, 29, for example. The first annular extension 28 may be formed at the same time when the clamp 26 is punched out of a metallic plate. The second annular extension 29 may be cut out of the spacer 27 by cutting tools, for example.

In addition, the impact reduction mechanism further comprise a protrusion 33 swelling from the bottom inner surface of the enclosure 11 in the vicinity of the rotation axis 24. The protrusion 33 is designed to extend in the circumferential direction of the rotation axis 24. An elastic member 34 is fixed at the top surface of the protrusion 33. The protrusion 33 may be formed integrally on the enclosure 11 at the same time when the enclosure 11 is cast in a die, for example.

The HDD 10 employing a so-called contact start stop (CSS) control allows the magnetic recording disks 13 to receive the flying head sliders 22a–22d when the HDD 19 is out of operation, in other words, the magnetic recording disks 13 stand still. The flying head sliders 22a–22d are respectively urged against the surfaces of the magnetic recording disks 13 at the innermost locations, namely, the locations nearest to the rotation axis 24. The elastic members 30, 31, 32, 34 are located behind the respective flying head sliders 22a–22d at positions spaced from the flying head sliders 22a–22d which are opposed to the surfaces of the magnetic recording disks 13.

When the magnetic recording disks 13 rotate, an airflow is induced to flow along the surfaces of the magnetic recording disks 13. The airflow serves to generate a lift of the flying head sliders 22a–22d. The respective flying head sliders 22a–22d accordingly fly above the surfaces of the magnetic recording disks 13. The carriage arm 16 then swings around so that the flying head sliders 22a–22d are positioned right above the target data tracks on the magnetic recording disks 13. The flying head sliders 22a–22d allow the magnetic transducers to write or read information into or out of the magnetic recording disks 13 without contacting the magnetic recording disks 13. The respective elastic members 30, 31, 32, 34 may be located at positions spaced from the magnetic recording disks 13 enough to avoid the contact between the elastic members 30, 31, 32, 34 and the flying head sliders 22a–22d during flying of the flying head sliders 22a–22d. Such spaced distance may be represented by approximately 200–500 μm, for example.

Here, assume that an impact is applied to the HDD 10 when the magnetic recording disks 13 stand still, for example. In particular, when an impact 36 is applied in the axial direction of the rotation axis 24, as shown in FIG. 2, the second and fourth suspensions 21b, 21d warp to move the tip ends away from the surfaces of the magnetic recording disks 13. The flying head sliders 22b, 22d at the tip ends of the suspensions 21b, 21d are moved away from the surfaces of the magnetic recording disks 13.

When the suspensions 21b, 21d warp, the suspensions 21b, 21d respectively allow the tip ends to collide with the elastic members 31, 34 located right behind the flying head sliders 22b, 22d. The movement of the flying head sliders 22b, 22d is thus restrained. Less resilience can be stored in the suspensions 21b, 21d. Less resilience of the suspensions 21b, 21d only accomplishes a smaller impact upon collision of the flying head sliders 22b, 22d against the magnetic recording disks 13. The damage to the magnetic recording disks 13 or the magnetic transducers embedded in the flying head sliders 22b, 22d may thus be prevented to the utmost.

In addition, when the tip ends of the suspensions 21b, 21d collide against the elastic members 31, 34, the elastic members 31, 34 may absorb the impact of the collision by the elasticity. It is accordingly possible to reliably avoid a powerful rebound of the flying head sliders 22b, 22d upon the annular extension 29 and the protrusion 33. As compared with a case where the flying head slider 22b, 22d collides directly against the surface of the annular extension 29 or the protrusion 33, it is also possible to weaken the impact of the rebounded flying head sliders 22b, 22d upon the magnetic recording disks 13. The magnetic recording disks 13 may keep receiving the first and third suspensions 21a, 21c, so that the first and third suspensions 21a, 21c hardly suffer from a warp in the aforementioned situation. The flying head sliders 22a, 22c are naturally prevented from colliding against the surface of the magnetic recording disks 13.

When an impact 37 is applied to the HDD 10 in the direction opposite to the aforementioned impact 36, as shown in FIG. 2, the first and third suspensions 21a, 21c may warp. However, the tip ends of the suspensions 21a, 21c collide against the elastic members 30, 32 in this situation, so that only a smaller resilience is stored in the suspensions 21a, 21c. Less resilience of the suspensions 21a, 21c only accomplishes a smaller impact upon collision of the flying head sliders 22a, 22c against the magnetic recording disks 13. The damage to the magnetic recording disks 13 or the magnetic transducers embedded in the flying head sliders 22a, 22c may thus be prevented to the utmost. The second and fourth suspensions 21b, 21d hardly suffer from a warp in the aforementioned manner.

Since the elastic members 30, 31, 32 are formed in an annular shape as described above in the HDD 10, the respective elastic members 30, 31, 32 are always located behind the corresponding flying head sliders 22a, 22b, 22c during rotation of the magnetic recording disks 13. It is accordingly not required to control the rotational angle or position of the magnetic recording disks 13 when the magnetic recording disks 13 stop rotating. On the other hand, it is unnecessary to form the protrusion 33 and the elastic member 34 into an annular shape. The protrusion 33 and the elastic member 34 may fixedly be positioned right behind the flying head slider 22d when the magnetic recording disks 13 stand still.

Figure 3:
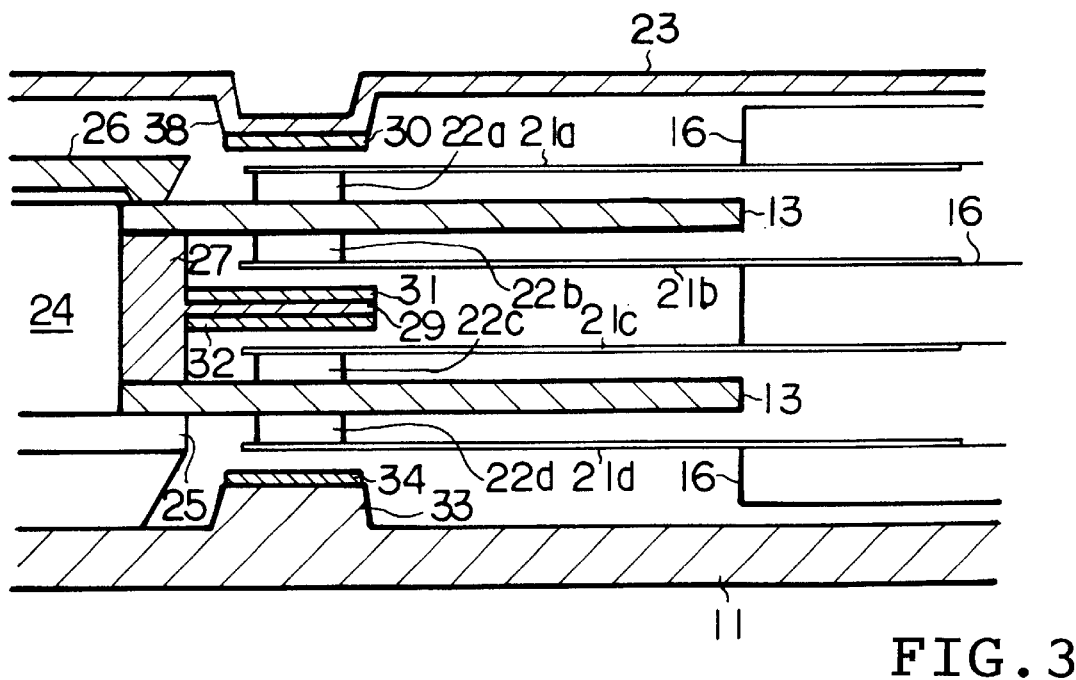
FIG. 3 is an enlarged partial sectional view of the HDD schematically illustrating an impact reduction mechanism according to a second embodiment of the present invention.

FIG. 3 schematically illustrates the structure of an impact reduction mechanism according to a second embodiment of the present invention. This impact reduction mechanism employs the elastic member 30 attached to the top surface of a protrusion 38 swelling from the inner surface of the cover 23, namely, a part of the enclosure 11, in place of the annular extension 28 formed on the clamp 26 in the aforementioned manner. The protrusion 38 may serve to reduce the thickness of the elastic member 30 as compared with a case where the elastic member 30 is attached to the cover 23 without the protrusion 38. In general, it is difficult to form the elastic member 30 of constant dimensions. A smaller thickness of the elastic member 30 serves to reduce the irregularity of the dimensions for the elastic member 30. The protrusion 38 may be formed integrally on the cover 23 at the same time when the cover 23 is punched out of a metallic plate. In this second embodiment, it is unnecessary to form the protrusion 38 and the elastic member 30 into an annular shape in the same manner as the aforementioned protrusion 33 and the elastic member 34. The protrusion 38 and the elastic member 30 may fixedly be positioned right behind the flying head slider 22a when the magnetic recording disks 13 stand still. It should be noted that the identical reference numerals are attached to structures or components achieving the same functions or advantages realized by those of the aforementioned first embodiment.

Figure 4:
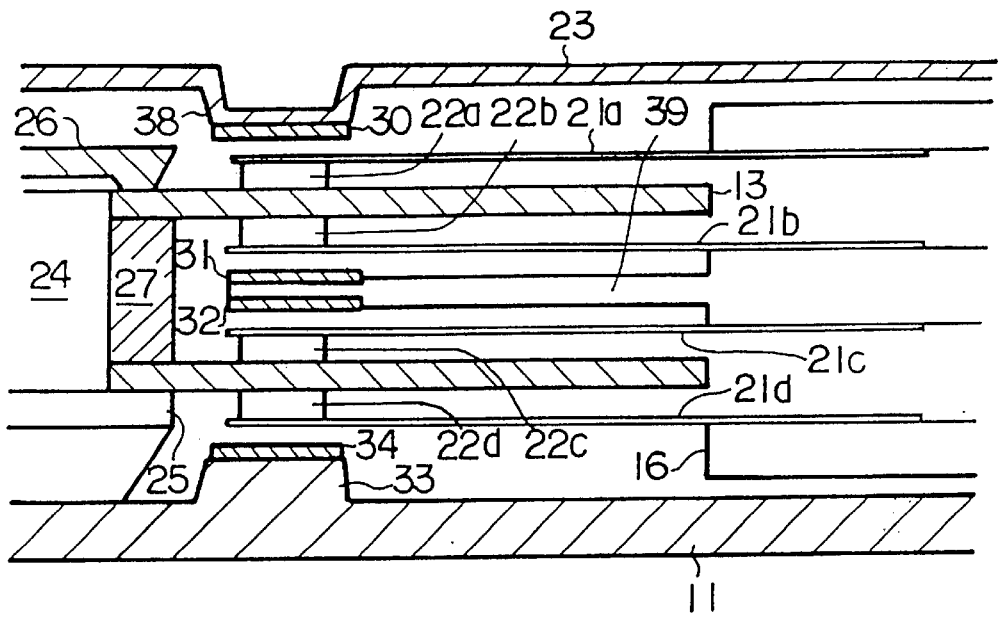
FIG. 4 is an enlarged partial sectional view of the HDD schematically illustrating an impact reduction mechanism according to a third embodiment of the present invention.

FIG. 4 schematically illustrates the structure of an impact reduction mechanism according to a third embodiment of the present invention. This impact reduction mechanism employs the elastic members 31, 32 attached to the tip ends of auxiliary arm 39 extending from the carriage arm 16, in place of the annular extension 29 formed on the spacer 27 in the aforementioned manner. The auxiliary arm 39 may be formed integrally on the carriage arm 16 at the same time when the carriage arm 16 is cast in a die, for example. The auxiliary arm 39 serves to always keep the elastic members 31, 32 right behind the flying head sliders 22b, 22c irrespective of the swinging movement of the carriage arm 16. Such auxiliary arm 39 may be formed not only for the elastic members 31, 32 in the above-described manner but also for the elastic members 30, 34. It should be noted that the identical reference numerals are attached to structures or components achieving the same functions or advantages realized by those of the aforementioned first and second embodiments.

Figure 5:
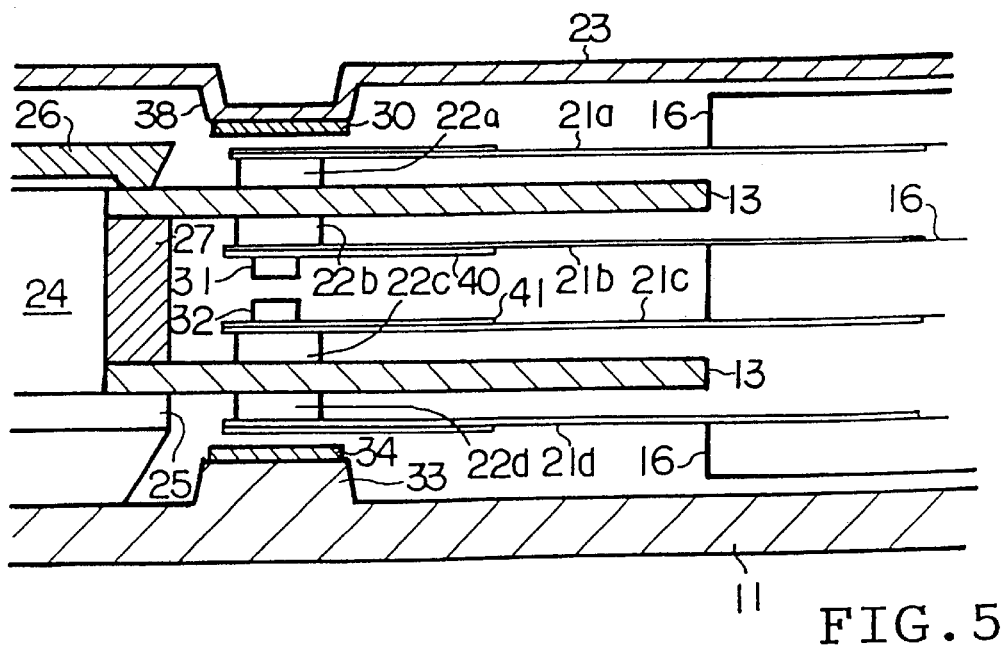
FIG. 5 is an enlarged partial sectional view of the HDD schematically illustrating an impact reduction mechanism according to a fourth embodiment of the present invention.

FIG. 5 schematically illustrates the structure of an impact reduction mechanism according to a fourth embodiment of the present invention. This impact reduction mechanism employs the elastic members 31, 32 attached to the backs of the corresponding flying head sliders 22b, 22c, in place of the annular extension 29 formed on the spacer 27 or the auxiliary arm 39 in the aforementioned manner. The respective elastic members 31, 32 may be fixed at the corresponding suspensions 21b, 21c right behind the corresponding flying head sliders 22b, 22c. Otherwise, the respective elastic members 31, 32 may be fixed at corresponding support plates 40, 41 which are attached to the backs of the respective suspensions 21b, 21c for reinforcing the rigidity of the suspensions 21b, 21c. Such impact reduction mechanism may be applied to conventional HDDs without adding the annular extension 29 or the auxiliary arm 39. It should be noted that the identical reference numerals are attached to structures or components achieving the same functions or advantages realized by those of the aforementioned first, second and third embodiments.

The aforementioned magnetic head assembly 14 may comprise contact head sliders, in place of the flying head sliders 22a–22d, for keep contacting the surface of the magnetic recording disks 13. In addition, the elastic members 30, 31, 32, 34 may be employed not only in the aforementioned HDD 10 of the CSS control but also in an HDD of the other types, a similar recording disk drive, and the like.

What is claimed is:

1. A recording disk drive comprising:
   a recording disk,
   a head slider supported at the tip end of a resilient suspension so as to face the recording disk,
   a rotation axis receiving the recording disk for rotation;
   a flange extending from the rotation axis in a centrifugal direction;
   a clamp attached at a tip end of the rotation axis so as to urge the recording disk against the flange; and
   an elastic member attached to the clamp behind the head slider at a position spaced from the head slider located at an innermost position.

2. The recording disk drive according to claim 1, wherein the elastic member is attached to an extension extending in a centrifugal direction of the clamp.

3. The recording disk drive according to claim 2, wherein the extension is formed into an annular shape so as to entirely surround the clamp.

4. A recording disk drive comprising:

recording disks, a head slider supported at a tip end of a resilient suspension so as to face one of the recording disks, a spindle motor receiving the recording disks for rotation;

a spacer interposed between the adjacent ones of the recording disks; and an elastic member received on the spacer behind the head slider at a position spaced from the head slider.

5. The recording disk drive according to claim 4, wherein the elastic member is attached to an extension extending in a centrifugal direction of the spacer.

6. The recording disk drive according to claim 5, wherein the extension is formed into an annular shape so as to entirely surround the spacer.

7. A recording disk drive comprising:

a recording disk;

a head slider supported at a tip end of a resilient suspension so as to face the recording disk;

a carriage arm supporting the resilient suspension at a tip end;

an auxiliary arm extending from the carriage arm; and an elastic member received on a tip end of the auxiliary arm behind the head slider at a position spaced from the head slider.

8. The recording disk drive according to claim 7, further comprising a spindle motor receiving at least two of the recording disks for rotation, the auxiliary arm being located between the adjacent recording disks.

* * * * *